Sept. 12, 1933.　　　　C. W. PLOEN　　　　1,926,790
VALVE
Filed April 3, 1931　　　2 Sheets-Sheet 1
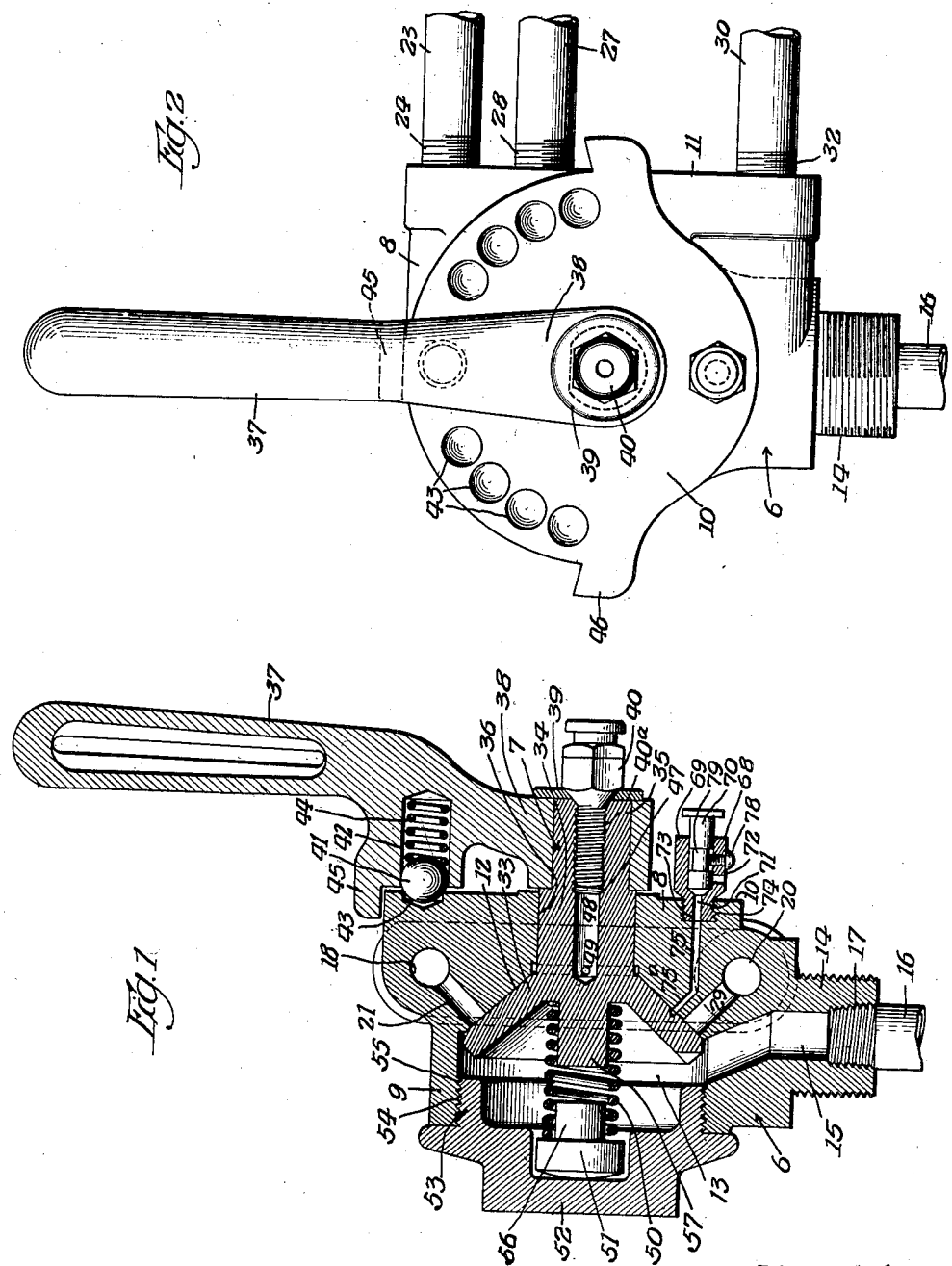

Sept. 12, 1933.  C. W. PLOEN  1,926,790
VALVE
Filed April 3, 1931  2 Sheets-Sheet 2
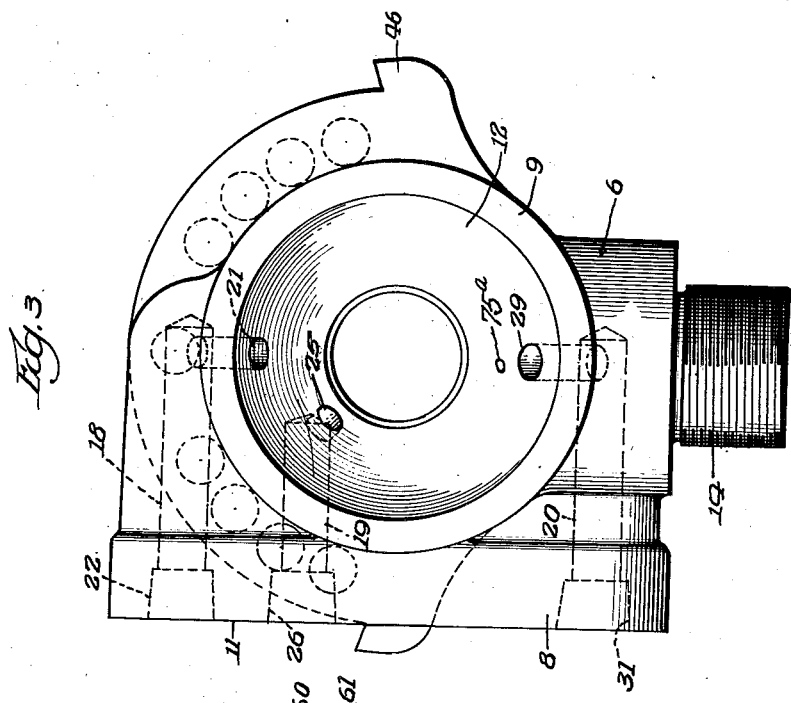
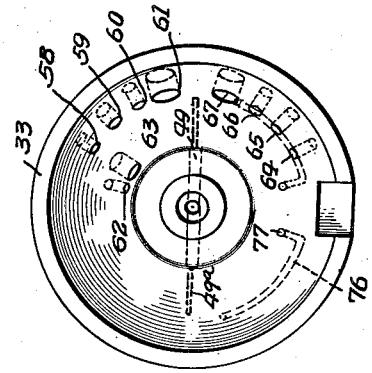
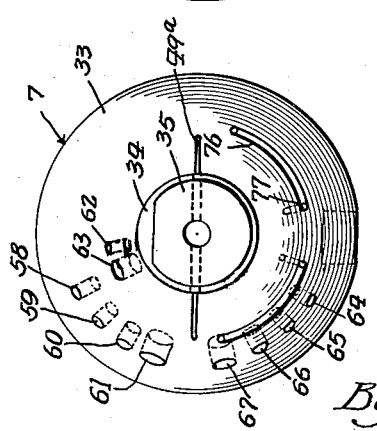
Inventor:
Curtis W. Ploen
By Fred Gerlach
Atty Patented Sept. 12, 1933

1,926,790

UNITED STATES PATENT OFFICE 1,926,790

VALVE

Curtis W. Ploen, Chicago, Ill., assignor to Viloco Railway Equipment Co., Chicago, Ill., a corporation of Illinois Application April 3, 1931. Serial No. 527,425

5 Claims. (Cl. 251—87)

The invention relates generally to valves for use in controlling the delivery of air under pressure to track sanders for locomotives. More particularly the invention relates to that type of valve which is adapted to be placed in the cab of the locomotive, receives air under pressure from the main air reservoir of the locomotive and comprises (1) a casing which embodies an air chamber and a conical valve seat facing the chamber and is provided with outlet ducts for supplying air under pressure from the chamber to the various sanders for the locomotive; (2) a rotatable valve-member which fits within the seat, embodies a stem and is provided with ports for effecting communication between the air chamber and the outlet ducts; and (3) a handle which is connected to the stem and is adapted, when shifted, to rotate the valve in order to bring the ports into registry with the outlet ducts for sander operating purposes.

One object of the invention is to provide a valve of the aforementioned type in which the casing permits of a compact arrangement within the locomotive cab of the pipes that lead to the various sanders by virtue of the fact that it embodies a flat side face and the outlet ducts for supplying air under pressure from the chamber to the sanders extend through the face and lead to the conical valve seat that faces the chamber.

Another object of the invention is to provide a valve of the type under consideration in which the ports in the rotatable valve-member are so arranged that when the valve-member is rotated or shifted in one direction, communication is established between two of the outlet ducts and the air chamber with the result that two of the sanders are simultaneously supplied with air.

A further object of the invention is to provide a valve of the type to which this invention relates in which the stem of the valve-member is provided with a longitudinally extending passageway and cross ports or ducts at the inner end of the passageway whereby grease or a similar lubricant may be supplied from the outside of the valve casing to the valve seat and the bearing for the stem.

A still further object of the invention is to provide a valve for controlling the supply of air to locomotive track sanders which is generally of new and improved construction, may be manufactured at a low and reasonable cost and is an improvement, as far as design and operation are concerned, over that exhibited in United States Letters Patent No. 1,022,613 granted April 9, 1912 to Harry Vissering.

Other objects of the invention and the various advantages of the present valve construction will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Fig. 1 is a vertical longitudinal section of a valve embodying the invention;

Fig. 2 is a front view exhibiting in detail the external construction of the valve casing;

Fig. 3 is a rear view of the casing of the valve, parts being omitted so as to illustrate the manner in which the outlet ducts communicate with the air chamber through the valve seat;

Fig. 4 is a front view of the rotatable valve-member for controlling the delivery of air under pressure from the air chamber to the outlet ducts; and Fig. 5 is a rear view of the valve-member.

The valve which forms the subject matter of the invention is designed primarily to control the delivery of air under pressure to the track sanders of a locomotive. It is adapted to be mounted in the cab of the locomotive and comprises a casing 6 and a valve-member 7. The casing is preferably formed of a one piece casting and consists of a comparatively thick front part 8 and a back part 9. The front part 8 of the casing embodies a front face 10 and a flat side face 11 and is provided at the rear thereof with a conical valve seat 12. The back part 9 is in the nature of an annular flange which projects rearwardly from and is formed integrally with the front part 8 an defines a substantially cylindrical chamber 13 around the conical valve seat 12. The lower or bottom portion of the back part 9 of the casing is shaped so as to form a depending tubular extension 14. This extension communicates with the chamber 13 by way of a passage 15, and is adapted to be used to support the valve in an upright position in the locomotive cab. A pipe 16 is connected to the extension 14 by a screw thread connection 17 and operates to supply the chamber 13 with air under pressure from the main air reservoir of the locomotive or any other suitable source of air supply.

The front part 8 of the casing 6 has formed therein an upper horizontally extending duct 18, an intermediate horizontally extending duct 19 and a lower horizontally extending duct 20. The upper horizontally extending duct 18 extends through the side face 11 and communicates with the chamber 13 by way of a passage 21. The latter extends downwardly and rearwardly from the inner end of the duct 18 and leads to the central upper part of the conical valve seat 12, as illustrated in Fig. 3. The outer end of the duct 18 is enlarged and forms a socket 22 for one end of a pipe 23. The pipe 23 is held within the socket by a screw thread connection 24 and operates to deliver air from the duct 18 to a track sander for the locomotive. The horizontally extending duct 19 is located directly beneath the duct 18 and extends through the flat side face 11 of the front part of the casing. It communicates with the chamber 13 in the back part of the casing by means of a passage 25 and, as illustrated in Fig. 3, is shorter than the duct 18. The passage 25 extends downwardly and rearwardly from the inner end of the duct 19 and intersects the valve seat 12 at a point beneath and at one side of the passage 21. The outer end of the duct 19 is enlarged so as to form a socket 26 and supplies air under pressure through a pipe 27 to a second sander for the locomotive with which the valve is used. The end of pipe 27 that communicates with the duct 19 is disposed in the socket 26 and is connected to the front part of the casing by a screw thread connection 28. The horizontally extending duct 20 is disposed in the lower or bottom portion of the casing part 8 and is disposed beneath the valve seat 12 and in vertical alignment with the ducts 18 and 19. It extends through the flat side face 11 of the front part of the casing and communicates with the chamber 13 by way of a passage 29. The latter is positioned directly in front of the passage 15, extends upwardly and rearwardly from the inner end of the duct 20 and leads to the central lower portion of the valve seat 12. The outer end of the duct 20 supplies air through a pipe 30 under pressure to a third track sander for the locomotive. The inlet end of the pipe 30 is disposed in a socket 31 at the outer end of the duct 20 and is secured in place by a screw thread connection 32. The horizontally extending ducts 18, 19 and 20 are preferably made by drilling into the flat side face 11 of the front part of the casing. The passages 21, 25 and 29 are preferably formed by drilling through the portion of the casing that forms or defines the valve seat 12. An advantage of having the ducts 18, 19 and 20 extend through the face 11 is that the pipes 23, 27 and 30 project in the same direction from the casing and hence do not take up much space within the cab of the locomotive.

The valve-member 7 operates, as hereinafter described, to control the passage of air under pressure from the chamber 13 to the horizontally extending ducts 18, 19 and 20 and consists of a conical valve part 33 and a cylindrical stem 34. The conical valve part 33 is formed integrally with the stem and fits directly against and corresponds in shape or contour to the seat 12. The stem 34 is provided with a reduced portion 35 at its outer end and is mounted rotatably in a circular opening 36 in the front part 8 of the casing so that the conical valve part 33 may be rotated or turned relatively to the seat 12. Rotation of the valve member 7 is effected by means of a handle 37. The latter extends upwardly and embodies a hub 38 which fits around the reduced part 35 of the valve stem 34. The hub of the handle is held in connected relation with respect to the reduced portion 35 by means of a washer 39. The latter is mounted around a grease fitting 40 and is held by the fitting so that it clamps the hub 38 against the outer end of the stem 34. The handle 37 is held in the various positions into which it is shifted by means of a ball 41. This ball is mounted in an open-ended socket 42 in the central portion of the handle and cooperates with an arcuate series of recesses 43 in the front face of the casing part 8. A coil spring 44 is disposed in the socket 42 and urges the ball 41 towards the front face 10 so that it tends to lodge in the recess adjacent which it is positioned. Movement of the handle for valve rotating purposes is limited by means of a lug 45 which is formed integrally with and projects rearwardly from the central portion of the handle, laps the top or upper face of the casing part 8 and cooperates with a pair of ears 46. The ears are formed integrally with and project outwardly from the side portions of the front part 8 of the casing and operate as stops or abutments for the lug 45. The upper or top portion of the casing part 8 is substantially semi-circular in conformation so that the lug 45 is free to move therearound during movement of the handle.

The grease fitting 40 which supports the washer 39 is provided at its rear end with an externally threaded stem 40ª. The latter extends into and is connected to an internally threaded socket 47 in the reduced portion 35 of the stem 34. To permit the stem 40ª to be readily inserted into the socket 47, the body portion of the fitting 40 is preferably of polygonal cross section. The inner or rear end of the socket 47 communicates with a passage 48 in the stem 34. This passage is adapted to receive grease from the fitting 40 and serves to supply the grease so received through radially extending ports or ducts 49 to the circular hole 36 and through grooves 49ª in the valve part 33 to the conical valve seat 12. The ports or ducts 49 extend between the inner or rear end of the passage 48 and the small end of the conical valve part 33. The grooves 49ª are formed in the face of the conical valve part 33 that engages the valve seat 12, and extend radially from the small end of the valve part 33. When it is desired to lubricate the conical valve seat 12 and the circular opening 36 in which is mounted rotatably the valve stem 34, a grease pump or gun is applied to the fitting 40 and is operated so as to force grease under pressure through the passage 48, the ports or ducts 49 and the grooves 49ª. By utilizing the fitting 40, the valve seat and the opening for the valve stem may be readily lubricated from the outside of the casing and simple means is provided for securing the valve operating handle 37 in place on the reduced portion 35 of the valve stem.

The conical valve part 33 of the valve member 7 is held against the seat 12 by means of a coil spring 50. This spring is interposed between the rear end of the valve part 33 and a button 51 in a cap 52. The cap 52 is provided with a forwardly extending annular flange 53 which fits within a circular opening 54 in the rear part 9 of the casing and is removably held in place by means of a screw thread connection 55. The button 51 is disposed in a recess 55 in the central portion of the cap 52 and is provided with a stem 56 for holding the rear end of the spring 50 against displacement relatively to the button. The front end of the spring extends around a cylindrical lug 57 which is formed integrally with and projects rearwardly from the back of the valve-member 7. The conical part 33 of the valve-member 7 is of such diameter that the circular opening 54 of the valve-member 7 may be inserted into place through the back part of the casing.

The conical part of the valve member 7 is provided with an arcuate series of ports 58, 59, 60 and 61, an arcuate series of ports 62 and 63, and an arcuate series of ports 64, 65, 66 and 67. The ports 58, 59, 60 and 61 of the first mentioned series are adapted, when the handle 37 is shifted from its vertical or off position towards the flat side face 11 of the casing part 8, to be brought successively into registry with the passage 21 so as to effect communication between the chamber 13 and the conduit 18. The ports 62 and 63 of the second mentioned series are adapted, during movement of the handle towards the side face 11, to be brought successively into registry with the passage 25 so as to effect communication of the conduit 19 with the chamber 13. The ports 64, 65, 66 and 67 of the third mentioned series are adapted, during shift of the handle in the opposite direction from its vertical or off position, that is, away from the flat side face 11, to be brought successively into registry with the passage 29 in order to effect communication of the lower horizontally extending conduit 20 and the chamber 13. The ports 58, 59 and 61 are of different sizes so that the user of the valve may deliver air under pressure in desired quantity to the duct 18 for passage to the pipe 23. The port 60, as illustrated in Fig. 4 of the drawings, is similar in size to the port 58. The port 62 for establishing communication between the duct 19 and the chamber 13 corresponds in size to the ports 58 and 60 and is so positioned that it registers with the passage 25 when the port 60 registers with the passage 21. By positioning the port 62 in this manner, the track sanders which are associated with the pipes 23 and 27 may be simultaneously supplied with air under pressure when the valve is properly manipulated. The port 63 is larger than the port 62 and is arranged so that it registers with the passageway 25 when the port 61 is brought into registry with the passage 21. As a result of this arrangement, it is possible, by shifting the handle 37 into the proper position, to effect simultaneously full communication between the ducts 18 and 19 and the chamber 13. The ports 64, 65, 66 and 67 are of different sizes and enable the user of the valve to supply air under pressure in desired quantity to the duct 20 for passage to the sander with which pipe 30 is associated.

For the purpose of indicating when the valve is opened, an alarm device 68 is provided. This device consists of a casing member 69 and a valve 70. The casing member 69 embodies a longitudinally extending duct 71 and a cross port 72, and is provided at its inner end with an externally threaded stem 73. The latter is mounted in and connected to an internally threaded socket 74 in the lower or bottom portion of the casing part 8. The cross port 72 extends from the longitudinally extending duct 71 through the side of the casing member 68. The longitudinally extending duct 71 receives air under pressure from the chamber 13 through a passage 75 in the front part 8 of the casing and a pair of arcuate grooves 76 in the outer face of the conical valve part of the valve-member. The passage 75 extends rearwardly from the socket 73 and is provided with a branch 75a which extends upwardly and is disposed directly above the passage 29 for the horizontally extending conduit 20. The grooves 76 communicate with the chamber 13 through ports 77 and are adapted to conduct air under pressure from the chamber 13 to the duct 71 and the ports 72 when the handle 37 is shifted in either direction from its vertical or off position. When communication is established between the chamber 13 and the longitudinally extending duct 71 in the casing member of the alarm device, the air that passes from the chamber 13 through the cross port 72 is discharged from the casing member with a hissing or whistling sound and indicates that the valve is open. The valve 70 is slidably mounted in the casing member 69 of the alarm device and operates, when shifted inwardly and held manually in such position, to close the longitudinally extending duct 71 in order to stop the passage of air from the chamber 13 to the cross port 72. When the valve 70 is released, the pressure of the air in the duct 72 forces the valve 70 in its outer or inoperative position and hence results in an opening of the alarm device. Outward movement of the valve 70 is limited by means of a screw 78 which extends through the casing member 69, is arranged so that its inner end projects into an annular groove 79 in the central portion of the valve 70.

The operation of the valve is as follows:

When it is desired to operate the sander which is associated with the pipe 23, the handle 37 is shifted towards the flat side face 11 of the casing part 8 a sufficient distance to bring either the port 58 or the port 59 into registry with the passage 21. In the event that it is desired to operate the sander which is associated at the same time the sander which is associated with the pipe 27, the handle 37 is shifted further towards the face 11 so as to bring either the port 62 or the port 63 into registry with the passage 25 for the duct 19. When communication is effected between the passage 25 and the chamber 13, communication is also established between the duct 18 and the chamber 13 by way of the port 60 or the port 61. In order to operate the sander which is associated with the pipe 30, the handle 37 is shifted in the opposite direction in order to bring any one of the ports 65, 66, 67 into registry with the passage 29 for the duct 20. When the handle 37 is shifted in either direction from its vertical or off position, communication is established between the chamber 13 and the passage 75 for the alarm device. This results in an alarm being given as the result of air under pressure passing through the duct 71 and the cross port 72. In the event that it should be desired to render the alarm device 68 temporarily inoperative, such, for example, as when the valve is left open for a long time, it is only necessary to press the valve 70 of the alarm device inwardly in order to close the longitudinally extending duct 71 in the casing member 69. Lubrication of the valve seat 12 and the opening 35 is effected by applying a grease pump to the fitting 40 and forcing grease through the passage 48 and the radially extending ports or ducts 49.

The herein disclosed valve may be manufactured at a comparatively low cost by virtue of the fact that it consists of but a small number of parts. It is extremely efficient in operation in that it contemplates the simultaneous supply of air under pressure to a plurality of sanders and embodies means whereby the valve seat and the bearing for the valve stem may be readily lubricated.

Whereas the valve has been described as adapted for use with air under pressure and in connection with track sanders, it is to be understood that the valve may be used equally as well with other fluids and to control other types of fluid pressure operated devices. It is also to be understood that the invention is not to be restricted to the details set forth, since these may be modified within the scope of the appended claims, without departing from the spirit and scope of the invention.

Having thus described the invention, what I claim as new and desire to secure by Letters Patent, is:

1. In a valve of the character described, the combination of a casing having a flat, vertically extending face at one side thereof and embodying a pressure chamber in its back portion and a valve seat in the front portion facing rearwardly onto the chamber, said casing also embodying in its front portion a horizontal outlet duct positioned above the seat, extending through the side face and having an inlet passage at its inner end leading backwardly and downwardly to the top part of the seat, and a second horizontal outlet duct positioned beneath the valve seat, extending through the side face and having an inlet passage at its inner end leading backwardly and upwardly to the bottom part of the valve seat, means for supplying fluid under pressure to the chamber for delivery to the outlet ducts via said passages, a rotatable valve-member for controlling the delivery of fluid from the chamber to said ducts, fitting against the seat and provided at one side thereof with an upper arcuate series of ports adapted, during rotation of the valve member in one direction, to be brought successively into registry with the inlet passage for the first mentioned outlet duct, and also provided in said one side with a lower arcuate series of ports adapted during rotation of the valve-member in the opposite direction to be brought successively into registry with the inlet passage for the aforesaid second outlet duct, a stem on the valve-member extending through the casing, and a handle for rotating the valve-member connected to the outer end of the stem.

2. In a valve of the character described, the combination of a casing having a flat, vertically extending face at one side thereof and embodying a pressure chamber in its back portion and a valve seat in the front portion facing rearwardly onto the chamber, said casing also embodying in its front portion a horizontal outlet duct positioned above the seat, extending through the side face and having an inlet passage at its inner end leading backwardly and downwardly to the top part of the seat, a second horizontal outlet duct positioned beneath the valve seat, extending through the side face and having an inlet passage at its inner end leading backwardly and upwardly to the bottom part of the valve seat, and a third horizontal outlet duct positioned between the two other ducts and likewise extending through the side face and having an inlet passage at its inner end leading backwardly to the valve seat at a point between and nearer the center thereof than the other two passages, means for supplying fluid under pressure to the chamber for delivery to the outlet ducts via their respective passages, a rotatable valve-member for controlling the delivery of fluid from the chamber to said ducts, fitting against the seat and provided with a port adapted during rotation of the valve-member in one direction to be brought into registry with the inlet passage for the first mentioned outlet duct, a port adapted during rotation of the valve-member in the other direction to be brought into registry with the inlet passage for said second outlet duct and a third port adapted in response to rotation of the valve-member to be brought into registry with the inlet passage of the third outlet duct and arranged so that it is brought into registry with the latter passage when one of the other ports is brought into registry with its respective passage, a stem on the valve-member mounted rotatably in the casing between the first and second mentioned outlet ducts and extending through the front portion of the casing, and a handle for rotating the valve-member connected to the outer end of the stem.

3. In a valve of the character described, the combination of a casing having a front face and a flat, vertically extending side face and embodying a pressure chamber in its back portion and a valve seat in the front portion facing rearwardly onto the chamber, said casing also embodying in its front portion a horizontal outlet duct positioned above the seat, extending through the side face and having an inlet passage at its inner end leading backwardly and downwardly to the top part of the seat, a second horizontal outlet duct positioned beneath the valve seat, extending through the side face and having an inlet passage at its inner end leading backwardly and upwardly to the bottom part of the valve seat, and an alarm passage extending from the valve seat through front face and positioned above the second outlet duct, means for supplying fluid under pressure to the chamber for delivery to the outlet ducts, a rotatable valve-member for controlling the delivery of fluid under pressure from the chamber to said ducts via the passages, fitting against the seat and provided with an upper port, adapted during rotation of the member in one direction, to be brought into registry with the inlet passage for the first mentioned outlet duct, a lower port adapted, during rotation of the valve-member in the opposite direction, to be brought into registry with the inlet passage for said second outlet duct, and means operative to effect communication between the chamber and the alarm passage when either port is brought into registry with its respective passage, a stem on the valve-member mounted rotatably in the casing between the outlet ducts and extending through the front face of the casing, and a handle for rotating the valve-member connected to the outer end of the stem.

4. In a valve of the character described, the combination of a casing embodying a pressure chamber and a valve seat facing the chamber and provided with three outlet ducts with inlet passages leading from the inner ends of the ducts to the valve seat, means for supplying fluid under pressure to the chamber for delivery to the outlet ducts via the passages, a rotatable valve-member for controlling the delivery of fluid under pressure from the chamber to said ducts, fitting against the seat and provided with a pair of ports adapted in response to rotation of the member in one direction, to be brought simultaneously into registry with two of the inlet passages, and also provided with a third port adapted in response to rotation of the valve-member in the opposite direction to be brought into registry with the third inlet passage, a stem on the valve-member extending through the casing, and a handle for rotating the valve-member connected to the outer end of the stem.

5. In a valve of the character described, the combination of a casing embodying a chamber and a valve seat facing the chamber and provided with a pair of outlet ducts and a pair of passages leading from the inner ends of the ducts to the valve seat, means for supplying fluid under pressure to the chamber for delivery to the outlet ducts, a rotatable valve-member for controlling the delivery of fluid under pressure from the chamber to said ducts, fitting against the seat and provided with a series of ports adapted in response to rotation of the member in one direction to be brought successively into registry with one of the passages, and a port adapted during rotation of the member in said one direction to be brought into registry with the other passage and arranged so that it is brought into registry with said other passage when one of the ports of the series is brought into registry with said one passage, a stem on the valve-member extending through the casing, and a handle for rotating the valve-member connected to the outer end of the stem.

CURTIS W. PLOEN.